United States Patent

[11] 3,580,070

| | | |
|---|---|---|
| [72] | Inventor | Edward H. Cumpston, Jr.<br>43 Monument Ave., Old Bennington, Vt. 05201 |
| [21] | Appl. No. | 744,000 |
| [22] | Filed | July 11, 1968 |
| [45] | Patented | May 25, 1971 |

[54] HEAT METER
9 Claims, 5 Drawing Figs.

[52] U.S. Cl. ................................................. 73/193
[51] Int. Cl. ................................................. G01n 1/00
[50] Field of Search ............................................. 73/190, 193

[56] References Cited
UNITED STATES PATENTS
2,359,767  10/1944  Keinath ...................... 73/193X
3,167,957  2/1965  Ziviani ........................ 73/193

FOREIGN PATENTS
889,816  2/1962  Great Britain ................ 73/193

*Primary Examiner*—James J. Gill
*Assistant Examiner*—John K. Lunsford
*Attorney*—Cumpston, Shaw & Stephens ABSTRACT: The heat carried by a variable temperature fluid moving at a known rate through a conduit is measured by recording the time required for a conductor thermally coupled to the conduit to lose heat to the conduit from a predetermined higher temperature that is maintained by a heater and a temperature-sensitive switch thermally coupled to the conductor.

PATENTED MAY 25 1971 3,580,070

INVENTOR.
EDWARD H. CUMPSTON Jr.

BY Cumpston, Shaw
and Stephens.

ATTORNEYS

HEAT METER

This invention is concerned with the measurement of the amount of heat carried by a fluid flowing in a pipe when the temperature of the fluid is changing and the flow rate remains constant. In particular this invention relates to the accurate billing of apartment house tenants for their heating and cooling demands.

It is common practice to heat, and cool, apartment buildings with a central hot, or cold, water system. Each apartment has its own circulating pump, controlled by its own thermostat, which draws water from the system main line. The apartment tenant sets his thermostat to suit himself. Since each apartment may have a different incoming water temperature which is continuously changing, and since each apartment may extract a different amount of heat from the circulating water, the problem of determining the net heat delivered, or removed, becomes somewhat complex.

For all present considerations the heat contained in a gallon of water is directly proportional to its temperature so the net heat delivered to an apartment can be found by adding the gallons of water circulated with each gallon multiplied by the degrees change in its temperature as it passed through the apartment. For a given apartment using a given circulating pump the flow rate can be determined and will not change. This means that net heat delivered is equal to the determined (or preset) flow rate multiplied by the number of minutes the circulating pump was running, with each minute multiplied by the temperature drop during that particular minute.

The summation of time vs. temperature is an integration problem the likes of which is normally solved by fairly complex electronic equipment, not suitable for field installation in an apartment house.

It is the object of this invention to provide a simple, inexpensive, and reliable system for determining and recording the integral of temperature vs. time.

It is a further object of this invention to provide a system for determining net heat delivered by recording the integral of temperature difference vs. time.

THE INVENTIVE SOLUTION

This invention has two parts, a transducer which is thermally connected to the fluid conduit and an electrically operated recorder. The transducer is comprised of a thermal conductor or medium, usually a strip of metal; an electric heater, and a temperature switch. The heater and the switch are both thermally connected to the conductor. The temperature switch is of the type which opens electrical contacts on rising temperature when a preset temperature is reached. The preset temperature is above the highest temperature the fluid will reach. The entire transducer is thermally insulated to eliminate any ambient temperature effects.

The transducer is connected to an electrical power supply, usually 110 volts AC The temperature switch supplies power to the heater, which in turn heats the conductor, until the preset temperature is reached, at which time the switch turns the heater off. The conductor is thus kept hotter than the fluid conduit pipe and will lose its heat to the pipe, cooling the switch, which will again turn the heater on.

The rate of heat flow in any conductor is directly proportional to the temperature difference. The hotter the fluid the closer its temperature is to the preset temperature of the switch and the slower the heat flow will be from the conductor into the fluid-conducting pipe. As the heat flow rate goes down the percent of the time that the heater will be off is increased proportionately.

The size of the heater and the conducting capacity of the conductor are preferably matched so that the heater can reach the preset switch temperature at the lowest expected fluid temperature and highest heat flow rate.

The electrically operated recorder is preferably comprised of a standard normally closed relay, and a synchronous clock motor connected to a mechanical revolution counter. The relay is preferably used to turn the motor on when the heater in the transducer is off. Thus as the fluid temperature goes up the percent of the time that the heater is on will go down and the percent of the time that the counter is running will go up to record the higher fluid temperature. So long as a plot of percent of the time the heater is off vs. fluid temperature is a straight line the reading of the counter is a direct measure of the heat carried by the fluid. Preferably, the gear ratio in the clock motor can be changed to match the determined fluid flow rate so the reading of the counter can be directly in any heat units desired.

The above-described recorder, with one transducer, will measure the heat carried in one pipe. In an apartment system the recorder must subtract the outgoing heat from the incoming to measure net heat delivered. This net heat system preferably uses two transducers, two double pole, double throw relays, and a reversible or dual coil clock motor. Operation is similar to the one pipe system except that the outgoing transducer runs the counter backward and the incoming transducer runs it forward, the result being net heat delivered.

If no changes are made cooling an apartment will run the counter backward and can be recorded by adjusting the device. To eliminate unnecessary operating time the power supply for this heat metering system is preferably taken from the circulating pump circuit so the metering system operates only when the pump is on and there is flow in the pipe. The metering system will record zero net heat when there is zero flow because the in and out temperatures will quickly reach the same ambient level, but the relays and heaters will be operating needlessly to record zero.

SUMMARY OF THE INVENTION

The inventive heat-measuring device includes a heat conductor thermally coupled to a conduit carrying fluid moving at a known rate and having varying temperatures; an electric heater and a temperature responsive switch thermally coupled to the conductor and spaced from the conduit; the switch being arranged for energizing the heater to maintain a portion of the conductor at a predetermined temperature above the temperature of the fluid; and means for recording the percent of operating time that the heater is either on or off.

DRAWINGS

DETAILED DESCRIPTION

Figure 1:
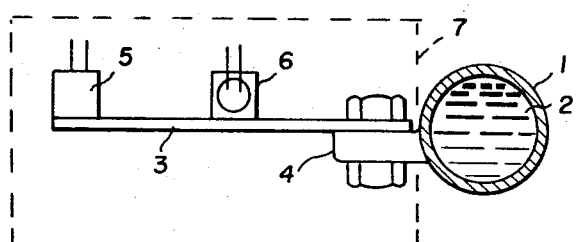
FIG. 1 shows a transducer thermally connected to a fluid carrying pipe.

FIG. 1 shows the transducer arrangement in which pipe 1 is carrying the hot fluid 2.

One method of thermally connecting conductor 3 to pipe 1 is shown at 4 where the pipe has a flange cast on it. The temperature switch 5 and heater 6 are screwed or soldered directly to the conductor 3. The entire transducer is enclosed in an insulating material represented by 7. It is usually desirable to mount the heater between the temperature switch and the pipe since the switch then heats and cools more slowly, increasing the cycle time, reducing the number of cycles, and increasing the life of the components.

When switch 5 cools its electrical contacts close and turn on heater 6, which locally raises the temperature of conductor 3 above that of pipe 1 and fluid 2. Heat flows towards pipe 1, but conductor 3 is made small enough and heater 6 large enough so that the temperature at the heater continues to rise. Heat also flows towards the switch until the preset temperature is reached and the switch turns the heater off. Some overtravel raises the temperature at the switch slightly above the shutoff temperature. The conductor now continues to lose heat to pipe 1 until the switch starts the cycle over again. The cooler the fluid and pipe are the faster the conductor loses heat to them and the greater the "on" time will become.

Figure 2:
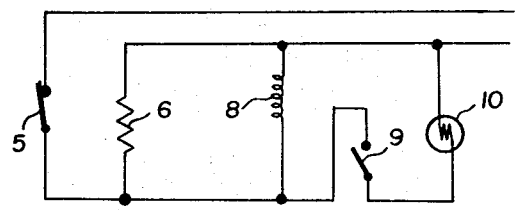
FIG. 2 is an electrical schematic of a single pipe transducer and recorder.

FIG. 2 schematically shows switch 5 closed, heater 6 on, relay coil 8 activated, normally closed relay contact 9 open, and revolution counter motor 10 off. The counter motor 10 will operate to drive the counter, not shown, to record the percent of the time that the heater is off, which is directly proportional to the heat flow seen by the transducer.

Figure 3:
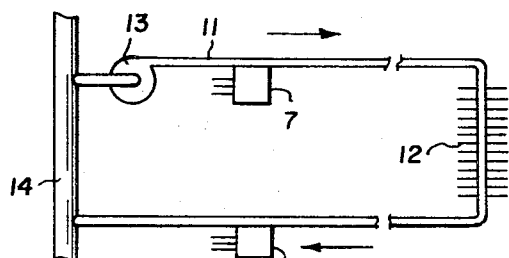
FIG. 3 shows the location of two transducers for a net heat metering system.

FIG. 3 shows a pipe loop 11 delivering hot fluid to a radiator 12. Since heat is given up by the fluid in the radiator the incoming temperature will be higher than the outgoing and the incoming transducer will be off more than the outgoing one. The difference between the off time for the two transducers 7 will be directly proportional to the net heat delivered to the radiator, and the difference in the on time will be the reciprocal of this. Either can be used to calculate the heat delivered.

If the heat given up by the radiator is doubled by increasing the incoming temperature and the circulating pump only runs half as much as before there will be no change in net heat delivered. The difference between the off times for the two transducers will be doubled to correctly sense the coupled rate of net heat delivery but the transducers will operate only when there is flow so the recorder will operate only half as long as before and will thus correctly show there has been no change in net heat delivered over a period of time.

Figure 4:
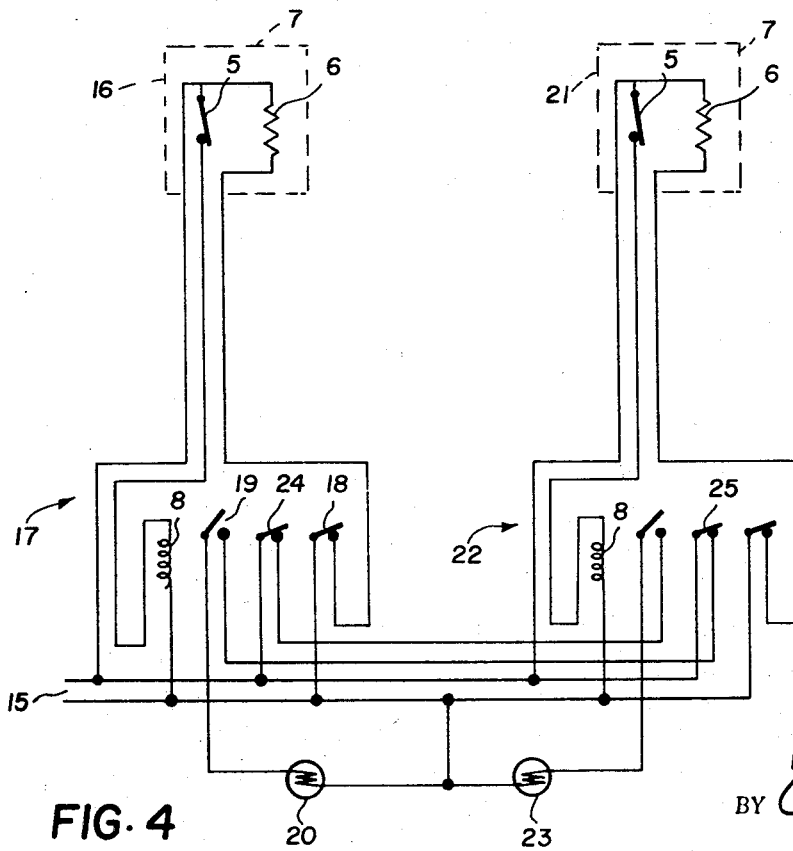
FIG. 4 is an electrical schematic of a complete heat metering system.

FIG. 4 is an electrical schematic of the complete system used to measure the net heat delivered by a pipe loop as shown in FIG. 3. Pump 13 in FIG. 3 draws hot fluid from main 14 and circulates it through loop 11. When pump 13 is turned on electrical power is simultaneously supplied to the system at 15, FIG. 4. In FIG. 4 the incoming transducer 16 is connected to relay 17 so that when temperature switch 5 closed relay coil 8 is activated, normally open contact 18 turns heater 6 on, and normally closed contact 19 turns the forward running counter motor coil 20 off. Out going transducer 21 is similarly connected to relay 22 and backward running counter motor coil 23.

To keep the counter motor coils from fighting each other when both temperature switches are open they are electrically locked out by the use of normally open contacts 24 and 25. In FIG. 4 both switches 5 are shown closed, both heaters 6 on, and both forward 20 and backward 23 counter motor coils off. If switch 5 in incoming transducer 16 should reach its preset temperature and open then coil 8 in relay 17 would be deenergized, contact 18 would turn heater 6 off, and contact 19 would close to run forward motor coil 20 through closed contact 25 in relay 22. The net revolutions produced by motor coils 20 and 23 will record the temperature differences between transducers 16 and 21 and for any period of time that is long compared to the natural frequency of the system the net revolutions will be an accurate measure of net heat delivered.

The component parts of this heat metering system are inexpensive, reliable, and readily available. The system is easy to install and has proven very accurate.

Figure 5:
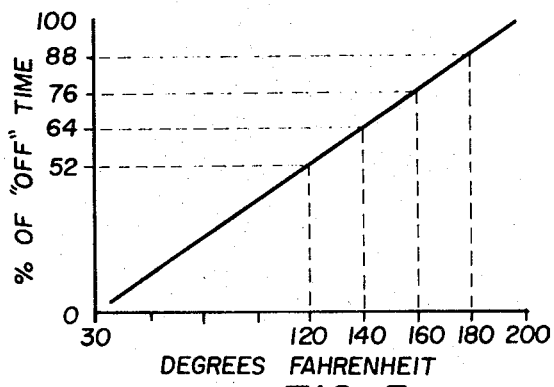
FIG. 5 is a graph of the straight line relationship between fluid temperature and percent of the time that the heater is off.

FIG. 5 gives some representative numbers showing one possible relationship between fluid temperature (°F.) and percent of the time that the heater is off and the count on (percent). If the incoming and outgoing transducers of a net heat system happened to be at 140° F. and 120° F. respectively then the counter would be running forward 64 percent of the time and backward 52 percent of the time for a net forward gain equal to operating forward 12 percent of the time. It can be seen that any 20° F. temperature drop in a net heat system would result in the same 12 percent net forward count. If the flow rate is 3 pounds of water per minute a 20° F. temperature drop would deliver 60 B.t.u. (3×20) per minute. Setting the counter rate at 500 per minute would result in a net count of 60 per minute (12 percent ×500) for a 20° F. temperature drop. The counter would then give a continuous summation of the heat delivered and would read directly in B.t.u.'s. Because the relationship shown in FIG. 5 is a straight line this summation would be correct for any temperature drop and any length of time.

Many various embodiments of the inventive concept can be adapted to particular heat-measuring problems. Persons wishing to practice the invention should remember that other embodiments and variations can be adapted to particular circumstances. Even though one point of view is necessarily chosen in describing and claiming the invention, this should not inhibit broader or related applications within the spirit of the invention. For example, if large capacity temperature switches are used they can operate the heaters and counter motors directly without any relays. In this case the counter motors will be running during "on" time and net heat will be shown by the counter if the incoming transducer turns the counter backward and the outgoing transducer turns the counter forward. In such an embodiment a mechanical system, such as a differential gearing, must be used to keep the counter motors from fighting each other.

I claim:

1. A device for measuring the heat carried by a fluid moving at a known rate through a conduit and having a varying unknown temperature, said device comprising:
    a. a heat conductor thermally coupled to said fluid conduit to lose heat to said conduit;
    b. an electric heater thermally coupled to said conductor and spaced from said conduit;
    c. a temperature-responsive switch thermally coupled to said conductor and spaced from said conduit;
    d. said switch being arranged for switching said heater on and off to maintain the portion of said conductor in the region of said switch at a predetermined temperature above the temperature of said fluid; and
    e. means for recording the percent of operating time that said heater is in a predetermined one of its states.

2. The device of claim 1 wherein said recording means is arranged for recording the percent of said operating time that said heater is off.

3. The device of claim 1 wherein said recording means is arranged for recording the percent of said operating time that said heater is on.

4. The device of claim 1 wherein said recording means comprises a synchronous motor and a revolution counter.

5. The device of claim 1 including a pump for forcing said fluid through said conduit and wherein said operating time is the time said pump is running.

6. A heat meter including a first one of the devices of claim 1 arranged on an input conduit in a heat exchange system and a second one of the devices of claim 1 arranged on an output conduit in said heat exchange system, and said recording means being arranged for recording the time difference of said predetermined states of said heaters of said first and second devices.

7. The meter of claim 6 wherein a pump is arranged for forcing said fluid through said first and second conduits, and said devices are arranged to operate whenever said pump is running.

8. The meter of claim 7 including relays respectively operated by said switches of said first and second devices for selectively energizing said heaters and said recording means.

9. The meter of claim 8 wherein said recording means comprises a reversible synchronous motor driven in one direction by said first device and in the opposite direction by said second device, and wherein said relays are arranged for preventing simultaneous opposing drive of said synchronous motor.